(12) United States Patent
Lunde et al.

(10) Patent No.: US 7,545,703 B2
(45) Date of Patent: Jun. 9, 2009

(54) MARINE SEISMIC STREAMER WITH VARYING SPACER DISTANCES FOR REDUCING TOWING NOISE

(75) Inventors: Nils Lunde, Houston, TX (US); Clet Antoine Landry, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/483,077

(22) Filed: Jul. 6, 2006

(65) Prior Publication Data

US 2008/0008047 A1    Jan. 10, 2008

(51) Int. Cl.
    *G01V 1/38* (2006.01)
(52) U.S. Cl. .......................................... 367/20; 367/154
(58) Field of Classification Search .................. 367/20, 367/153, 154
    See application file for complete search history.

(56) References Cited

U.S. PATENT DOCUMENTS

| | | | | |
|---|---|---|---|---|
| 3,518,677 A | * | 6/1970 | Florian | 367/154 |
| 4,351,036 A | * | 9/1982 | Mollere | 367/20 |
| 4,634,804 A | | 1/1987 | Spalding | |
| 4,775,962 A | * | 10/1988 | Keckler et al. | 367/154 |
| 4,951,265 A | | 8/1990 | Buckles | |
| 5,943,293 A | * | 8/1999 | Luscombe et al. | 367/20 |
| 6,614,723 B2 | * | 9/2003 | Pearce et al. | 367/154 |
| 7,142,481 B1 | * | 11/2006 | Metzbower et al. | 367/154 |
| 2004/0017731 A1 | * | 1/2004 | Halvorsen et al. | 367/166 |
| 2004/0042341 A1 | | 3/2004 | Tenghamn et al. | |
| 2006/0193203 A1 | * | 8/2006 | Tenghamn et al. | 367/20 |
| 2006/0239117 A1 | * | 10/2006 | Singh et al. | 367/20 |

FOREIGN PATENT DOCUMENTS

| | | |
|---|---|---|
| GB | 1348401 | 3/1974 |
| GB | 2421078 | 6/2006 |

OTHER PUBLICATIONS

UK Intellectual Property Office, Search Report, Oct. 9, 2007.

\* cited by examiner

*Primary Examiner*—Ian J Lobo
(74) *Attorney, Agent, or Firm*—E. Eugene Thigpen; Richard A. Fagin

(57) ABSTRACT

A seismic streamer includes a jacket covering an exterior of the streamer. At least one strength member extends along the length of the jacket. The strength member is disposed inside the jacket. At least one seismic sensor is disposed in an interior of the jacket. An acoustically transparent material fills void space in the interior of the jacket. A plurality of spacers is disposed at spaced apart positions along the strength member, wherein the distance between the spacers is varied.

9 Claims, 2 Drawing Sheets

MARINE SEISMIC STREAMER WITH VARYING SPACER DISTANCES FOR REDUCING TOWING NOISE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey apparatus and methods. More specifically, the invention relates to structures for marine seismic streamers that have reduced noise induced by effects of towing such streamers in the water.

2. Background Art

In a marine seismic survey, a seismic vessel travels on the surface of a body of water such as a lake or the ocean. The seismic vessel typically contains seismic acquisition control equipment, which includes devices such as navigation control, seismic source control, seismic sensor control, and signal recording devices. The seismic acquisition control equipment causes a seismic source towed in the body of water, by the seismic vessel or another vessel, to actuate at selected times. The seismic source may be any type well known in the art of seismic acquisition, including air guns or water guns, or most commonly, arrays of air guns. Seismic streamers, also called seismic cables, are elongate cable-like structures that are towed in the body of water by the seismic survey vessel or by another vessel. Typically, a plurality of seismic streamers is towed behind the seismic vessel laterally spaced apart from each other. The seismic streamers contain sensors to detect the seismic wavefields initiated by the seismic source and reflected from acoustic impedance boundaries in the subsurface Earth formations below the water bottom.

Conventionally, seismic streamers contain pressure-responsive sensors such as hydrophones, but seismic streamers have also been proposed that contain particle motion sensors, such as geophones, in addition to hydrophones. The sensors are typically located at regular intervals along the length of seismic streamers.

Seismic streamers also include electronic components, electrical wiring and may include other types of sensors. Seismic streamers are typically assembled from sections, each section being approximately 75 meters in length. A number of such sections are joined end to end, and can extend the assembled streamer to a total length of many thousands of meters. Position control devices, such as depth controllers, paravanes, and tail buoys are affixed to the streamer at selected positions and are used to regulate and monitor the movement of the streamer in the water. During operation, the seismic sources and streamers are typically submerged at a selected depth in the water. The seismic sources are typically operated at a depth of 5-15 meters below the water surface and the seismic streamers are typically operated at a depth of 5-40 meters.

A typical streamer section consists of an external jacket, connectors, spacers, and strength members. The external jacket is formed from a flexible, acoustically transparent material such as polyurethane and protects the interior of the streamer section from water intrusion. The connectors are disposed at the ends of each streamer section and link the section mechanically, electrically and/or optically to adjacent streamer sections and, therefore, ultimately link it to the seismic towing vessel. There is at least one, and are usually two or more such strength members in each streamer section that extend the length of each streamer section from one end connector to the other. The strength members provide the streamer section with the capability to carry axial mechanical load. A wire bundle also extends the length of each streamer section, and can contain electrical power conductors and electrical data communication wires. In some instances, optical fibers for signal communication are included in the wire bundle. Hydrophones or groups of hydrophones are located within the streamer section. The hydrophones have sometimes been located within corresponding spacers for protection. The distance between spacers is ordinarily about 0.7 meters. A hydrophone group, typically comprising 16 hydrophones, thus extends for a length of about 12.5 meters.

The interior of the seismic streamers is filled with a void filling material to provide buoyancy and desired acoustic properties. Most seismic streamers have been filled with a liquid core material, such as oil or kerosene. Such liquid-filled streamer design is well proven and has been used in the industry for a long time. However, there are disadvantages associated with using liquid as a core fill material. The first disadvantage is leakage of the liquid into the surrounding water in the event a streamer section is damaged. Such leakage may present an environmental problem. Damage can occur while the streamer is being towed through the water or it can occur while the streamer is being deployed from or retrieved onto a streamer winch on which streamers are typically stored on the seismic vessel.

A second disadvantage to using liquid-filled streamer sections is noise induced in the hydrophones generated by vibrations as the streamer is towed through the water. Such vibrations develop internal pressure waves that travel through the liquid in the streamer sections, such waves are often referred to as "bulge waves" or "breathing waves."

Ideally, in a streamer moving at constant speed, all the streamer components including the jacket, the connectors, the spacers, the strength members, wire bundle, sensors and void filling material all move at the same constant speed and do not move relative to each other. Under actual movement conditions, however, transient motion of the streamers takes place, such transient motion being caused by events such as pitching and heaving of the seismic vessel, movement of the paravanes and tail buoys attached to the streamers, strumming of the towing cables attached to the streamers caused by vortex shedding on the cables, and operation of depth-control devices located on the streamers. Any of the foregoing types of transient motion can cause transient motion (stretching) of the strength members.

Transient motion of the strength members displaces the spacers or connectors, causing pressure fluctuations in the liquid void filling material that are detected by the hydrophones. Pressure fluctuations radiating away from the spacers or connectors also cause the flexible outer jacket to compress in and bulge out in the form of a traveling wave, giving the phenomenon "bulge waves" its name.

In addition, there are other types of noise, often called "flow noise", which can affect the quality of the seismic signal detected by the hydrophones. For example, vibrations of the seismic streamer can cause extensional waves in the outer jacket and resonance transients traveling down the strength members. A turbulent boundary layer created around the outer jacket of the streamer by the act of towing the streamer can also cause pressure fluctuations in the liquid core-filling material. In liquid filled streamer sections, the extensional waves, resonance transients, and turbulence-induced noise are typically much smaller in amplitude than the bulge waves, however they do exist and affect the quality of the seismic signals detected by the hydrophones. Bulge waves are usually the largest source of vibration noise because these waves travel in the liquid core material filling the streamer sections and thus act directly on the hydrophones.

One approach to overcoming the disadvantages of liquid fill in streamers is to use a gel like fill made from curable polyurethane. Using a soft, flexible gel like material can also eliminate a substantial portion of the problem with "bulge waves", but the so-called Poisson effect from the strength members can increase. Because of the relatively high tensile stiffness of the strength members, transients generally travel along the strength members at velocities near to or lower than that of the sound velocity in water, such velocities typically in the range of 1000 to 1500 meters per second. The actual velocity of transients along the strength members depends mainly on the elastic modulus of the strength member material and the tension applied to the streamer as it is towed in the water. The lower the elastic modulus the more compliant the streamer will be, and thus the more transient energy it will dissipate as heat and the less will pass through the strength member. Special elastic sections are normally placed at either end of a streamer cable to reduce the effects of transients.

A streamer based on a buoyancy fill material made from curable, polyurethane based gel will have a longitudinal wave that is carried through the strength members of the streamer. When the streamer is excited by transient motion, the wave typically will travel with a velocity of around 1250 meters per second. When the longitudinal waves travels through the streamer they elongate and contract the streamer and generate pressure variations in the gel. The pressure variations will be detected by the sensors (hydrophones) and this will result in noise in the detected seismic data. The noise is normally at frequencies below about 30 Hz. The main reason for the pressure variations is believed to be that the deformation of the jacket is not equal to the deformation of the gel and therefore this mismatch generates pressure variation.

There is still a need to further improve the attenuation of longitudinal waves transmitted through the strength members of marine seismic streamers.

SUMMARY OF THE INVENTION

One aspect of the invention is a seismic streamer including a jacket covering an exterior of the streamer. At least one strength member extends along the length of the jacket. The strength member is disposed inside the jacket. At least one seismic sensor is disposed in an interior of the jacket. An acoustically transparent material fills void space in the interior of the jacket. A plurality of spacers is disposed at spaced apart positions along the strength member, with the distance between the spacers being varied.

A seismic streamer according to another aspect of the invention includes a jacket covering an exterior of the streamer. At least one strength member extends along the length of the jacket inside the jacket. A plurality of spacers is disposed at spaced apart locations along the strength member at varying spacings, with the maximum spacing between spacers being about eighty percent greater than the minimum spacing. At least one seismic sensor is disposed in an interior of the jacket; and an acoustically transparent material fills void space in the interior of the jacket.

Other aspects and advantages of the invention will be apparent from the following description and the appended claims.

DETAILED DESCRIPTION

Figure 1:
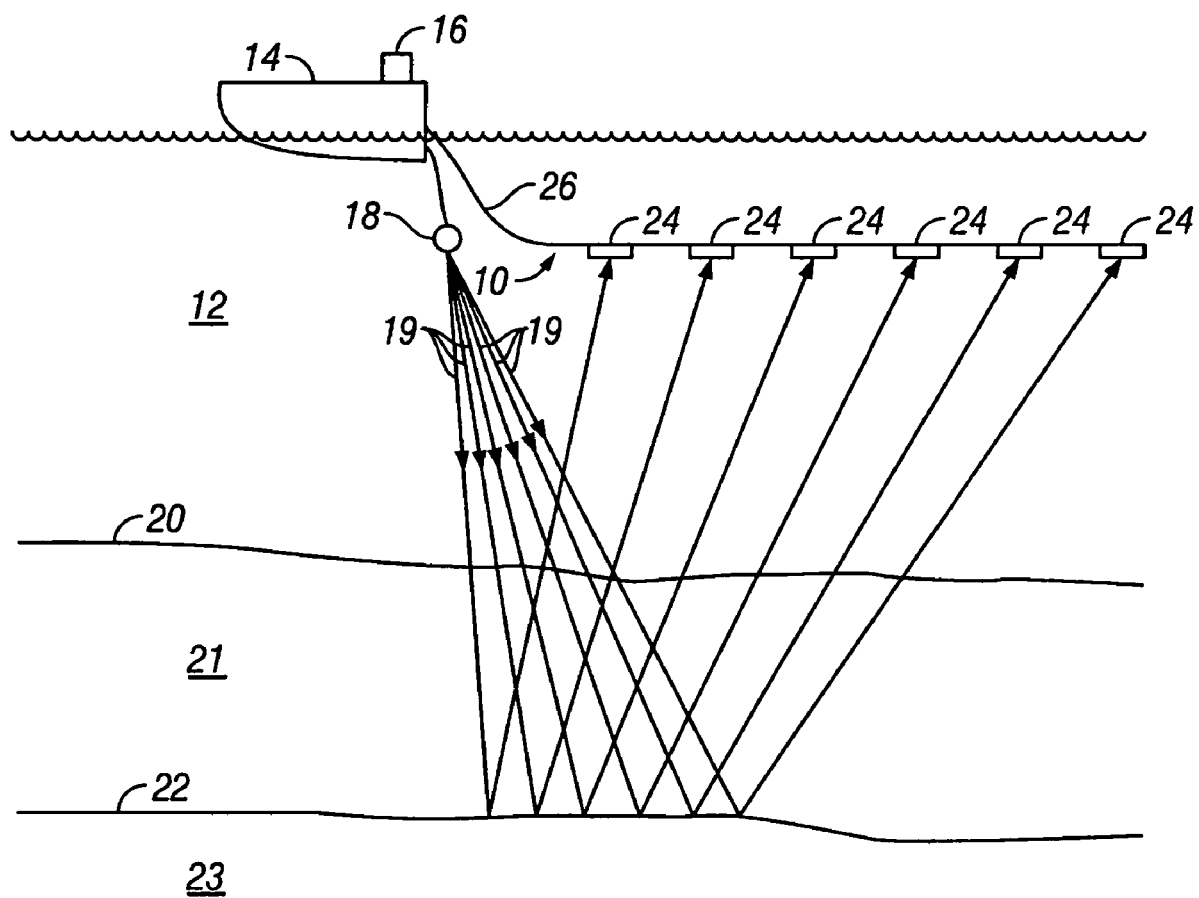
FIG. 1 shows typical marine seismic data acquisition using a streamer according to one embodiment of the invention.

FIG. 1 shows an example marine seismic data acquisition system as it is typically used on acquiring seismic data. A seismic vessel 14 moves along the surface of a body of water 12 such as a lake or the ocean. The marine seismic survey is intended to detect and record seismic signals related to structure and composition of various subsurface Earth formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such sources in the water 12. The seismic vessel 14 or a different vessel tows at least one seismic streamer 10 near the surface of the water 12. The streamer 10 is coupled to the vessel 14 by a lead in cable 26. A plurality of sensor elements 24, or arrays of such sensor elements, are disposed at spaced apart locations along the streamer 10. The sensor elements 24 are formed by mounting a seismic sensor inside a sensor spacer.

During operation, certain equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below. Seismic energy 19 is at least partially reflected from one or more acoustic impedance boundaries 22 below the water bottom 20, and travels upwardly whereupon it may be detected by the sensors in each sensor element 24. Structure of the formations 21, 23, among other properties of the Earth's subsurface, can be inferred by travel time of the energy 19 and by characteristics of the detected energy such as its amplitude and phase.

Figure 2:
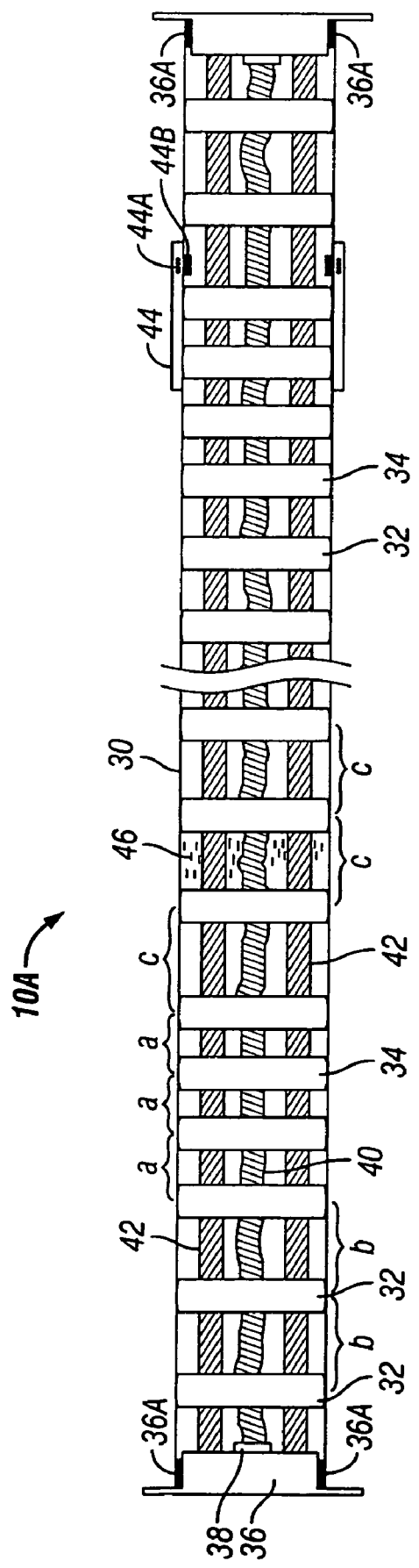
FIG. 2 shows a cut away view of one embodiment of a streamer segment according to the invention.

Having explained the general method of operation of a marine seismic streamer, an example embodiment of a streamer according to the invention will be explained with reference to FIG. 2. FIG. 2 is a cut away view of a portion (segment) 10A of a marine seismic streamer in accordance with the present invention (10 in FIG. 1). A streamer as shown in FIG. 1 may extend behind the seismic vessel (14 in FIG. 1) for several kilometers, and is typically made from a plurality of streamer segments connected end to end behind the vessel (14 in FIG. 1).

The streamer segment 10A in the present embodiment may be about 75 meters overall length. A streamer such as shown at 10 in FIG. 1 thus may be formed by connecting a selected number of such segments 10A end to end. The segment 10A includes a jacket 30, which in the present embodiment can be made from 3.5 mm thick transparent polyurethane and has a nominal external diameter of about 62 millimeters. In each segment 10A, each axial end of the jacket 30 may be terminated by a coupling/termination plate 36. The coupling/termination plate 36 may include rib elements 36A on an external surface of the coupling/termination plate 36 that is inserted into the end of the jacket 30, so as to seal against the inner surface of the jacket 30 and to grip the coupling/termination plate 36 to the jacket 30 when the jacket 30 is secured by and external clamp (not shown). In the present embodiment, two strength members 42 are coupled to the interior of each coupling/termination plate 36 and extend the length of the segment 10A. In a particular implementation of the invention, the strength members 42 may be made from a fiber rope made from a fiber sold under the trademark VECTRAN, which is a registered trademark of Hoechst Celanese Corp., New York, N.Y. The strength members 42 transmit axial load along the length of the segment 10A. When one segment 10A is coupled end to end to another such segment (not shown in FIG. 2), the mating coupling/termination plates 36 are coupled together using any suitable connector, so that the axial force is transmitted through the coupling/termination plates 36 from the strength members 42 in one segment 10A to the strength member in the adjoining segment.

The segment 10A can include a number of buoyancy spacers 32 disposed in the jacket 30 and coupled to the strength members 42 at spaced apart locations along their length. The buoyancy spacers 32 may be made from foamed polyurethane or other suitable, selected density material. The buoyancy spacers 32 have a density selected to provide the segment 10A preferably with approximately the same overall density as the water (12 in FIG. 1), so that the streamer (10 in FIG. 1) will be substantially neutrally buoyant in the water (12 in FIG. 1). As a practical matter, the buoyancy spacers 32 provide the segment 10A with an overall density very slightly less than that of fresh water. Appropriate overall density may then be adjusted in actual use by adding selected buoyancy spacers 32 and fill media having suitable specific gravity.

The segment 10A includes a generally centrally located conductor cable 40 which can include a plurality of insulated electrical conductors (not shown separately), and may include one or more optical fibers (not shown). The cable 40 conducts electrical and/or optical signals to the recording system (16 in FIG. 1). The cable 40 may in some implementations also carry electrical power to various signal processing circuits (not shown separately) disposed in one or more segments 10A, or disposed elsewhere along the streamer (10 in FIG. 1). The length of the conductor cable 40 within a cable segment 10A is generally longer than the axial length of the segment 10A under the largest expected axial stress on the segment 10A, so that the electrical conductors and optical fibers in the cable 40 will not experience any substantial axial stress when the streamer 10 is towed through the water by a vessel. The conductors and optical fibers may be terminated in a connector 38 disposed in each coupling/termination plate 36 so that when the segments 10A are connected end to end, corresponding electrical and/or optical connections may be made between the electrical conductors and optical fibers in the conductor cable 40 in adjoining segments 10A.

Sensors, which in the present embodiment may be hydrophones, can be disposed inside sensor spacers, shown in FIG. 2 generally at 34. The hydrophones in the present embodiment can be of a type known to those of ordinary skill in the art, including but not limited to those sold under model number T-2BX by Teledyne Geophysical Instruments, Houston, Tex. In the present embodiment, each segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each array should be selected so that the axial span of the array is at most equal to about one half the wavelength of the highest frequency seismic energy intended to be detected by the streamer (10 in FIG. 1). It should be clearly understood that the types of sensors used, the electrical and/or optical connections used, the number of such sensors, and the spacing between such sensors are only used to illustrate one particular embodiment of the invention, and are not intended to limit the scope of this invention. In other embodiments, the sensors may be particle motion sensors such as geophones or accelerometers. A marine seismic streamer having particle motion sensors is described in U.S. patent application Ser. No. 10/233,266, filed on Aug. 30, 2002, now issued as U.S. Pat. No. 7,239,577 to Tengrahmn et al., entitled, Apparatus and Method for Multicomponent Marine Geophysical Data Gathering, assigned to an affiliated company of the assignee of the present invention and incorporated herein by reference.

At selected positions along the streamer (10 in FIG. 1) a compass bird 44 may be affixed to the outer surface of the jacket 30. The compass bird 44 includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor cable 40 to the recording system (16 in FIG. 1). Measurements of direction are used, as is known in the art, to infer the position of the various sensors in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

In the present embodiment, the interior space of the jacket 30 may be filled with a material 46 such as "BVF" (Buoyancy Void Filler), which may be a curable, synthetic urethane-based polymer. The BVF 46 material serves to exclude fluid (water) from the interior of the jacket 30, to electrically insulate the various components inside the jacket 30, to add buoyancy to a streamer section and to transmit seismic energy freely through the jacket 30 to the sensors 34. The BVF material 46 in its uncured state is essentially in liquid form. Upon cure, the BVF material 46 no longer flows as a liquid, but instead becomes substantially solid. However, the BVF material 46 upon cure retains some flexibility to bending stress, substantial elasticity, and freely transmits seismic energy to the sensors 34. It should be understood that the BVF material used in the present embodiment only is one example of a gel-like substance that can be used to fill the interior of the streamer. Other materials could be also used. For example, heating a selected substance, such as a thermoplastic, above its melting point, and introducing the melted plastic into the interior of the jacket 30, and subsequent cooling, may also be used in a streamer according to the invention. Oil or similar material may also be used to fill the interior of the streamer. The sensor spacers 34 are typically molded from a rigid, dense plastic to better protect the seismic sensors therein from damage during handling and use.

In a streamer segment 10A made according to the invention, the longitudinal distance between the spacers (32, 34) is varied in order to attenuate the transmission of longitudinal waves along the streamer and the resulting pressure variation in the fill material. The variation in the distance between the spacers achieves a spatial filter that attenuates the transmission of noise along the streamer. An embodiment of the invention is illustrated in FIG. 2, which illustrates three difference lateral distances between the spacers 32, 34. The shortest distance is indicated by the letter "a". The intermediate distance is indicated by the letter "b" and the longer distance is indicated by the letter "c".

Typical dimensions for the outside diameter of streamers known in the art are 54 millimeters and 62 millimeters. Typical spacing between the spacers is about 0.25 meters (250 millimeters).

Tests performed on a streamer 10 having sections of 54 mm diameter and having center to center distance between spacers within streamer segments 10A of 130 millimeters, 220 millimeters and 235 millimeters have demonstrated the effectiveness of the present invention in reducing cable noise. In a particular embodiment, the maximum distance between the spacers is approximately eighty percent greater than the minimum distance between the spacers. Although having three different distances between spacers has been demonstrated to be effective in reducing noise, the invention should not be regarded as requiring three distance variations. A streamer cable having two different distances between spacers or more that three different distances is also within the scope of the present invention. In streamer segments having distance variations between spacers, substantially no noise induced by filler pressure variation was detected by the sensors in comparison to noise detected in the prior segments.

A streamer made as described herein may provide substantially reduced effect of "v-waves" (mechanically induced noise that propagates along a streamer) than streamers made according to structures known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer, comprising:
   a jacket covering an exterior of the streamer;
   at least one strength member extending along the length of the jacket, the strength member disposed inside the jacket;
   at least one seismic sensor disposed in an interior of the jacket;
   an acoustically transparent material filling void space in the interior of the jacket; and
   a plurality of spacers disposed at spaced apart locations along the strength member, distances between adjacent spacers being varied along the streamer and selected to create a spatial filter to attenuate noise transmitted longitudinally along the streamer, and wherein a maximum distance between adjacent spacers being approximately eighty percent greater than a minimum distance between adjacent spacers.

2. The streamer of claim 1 wherein the jacket comprises polyurethane.

3. The streamer of claim 1 wherein the at least one strength member comprises fiber rope.

4. The streamer of claim 3 further comprising two strength members.

5. The streamer of claim 1 wherein the spacers have a density selected to provide the streamer with a selected overall density.

6. The streamer of claim 5 wherein at least a portion of the spacers comprise foamed polyurethane.

7. The streamer of claim 1 further comprising a cable disposed inside the jacket, the cable having at least one of electrical conductors and an optical fiber, the cable adapted to carry signals from the at least one seismic sensor to a recording system.

8. The streamer of claim 1 wherein the at least one sensor comprises a hydrophone.

9. The streamer of claim 1 further comprising a termination plate coupled to each axial end of the jacket, the termination plates each coupled to the strength member at an axial end thereof, the termination plates adapted to couple to a corresponding termination plate in another segment of the streamer so as to transmit axial force therethrough.

* * * * *